United States Patent [19]

Baranger et al.

[11] Patent Number: 6,119,009
[45] Date of Patent: Sep. 12, 2000

[54] METHOD AND APPARATUS FOR MODELING THE PROPAGATION OF WIRELESS SIGNALS IN BUILDINGS

[75] Inventors: Harold Urey Baranger, Highland Park, N.J.; Denis Jacques Ullmo, Palaiseau, France

[73] Assignee: Lucent Technologies, Inc., Murray Hill, N.J.

[21] Appl. No.: 08/933,493

[22] Filed: Sep. 18, 1997

[51] Int. Cl.[7] ................................................. H04Q 7/20
[52] U.S. Cl. ......................................... 455/446; 455/67.1
[58] Field of Search ................................. 455/422, 446, 455/507, 522, 525, 524, 504, 506, 67.1, 67.2, 67.3, 674, 67.6, 63, 65, FOR 100; 324/644, 646

[56] References Cited

U.S. PATENT DOCUMENTS

| 5,301,127 | 4/1994 | Hitney ..................................... | 364/525 |
| 5,450,615 | 9/1995 | Fortune et al. ......................... | 455/67.6 |
| 5,623,429 | 4/1997 | Fortune et al. ......................... | 364/578 |

OTHER PUBLICATIONS

"WISE Design of Indoor Wireless Systems: Practical Computation and Optimization;" S.J. Fortune et al., IEEE Computational Science & Engineering, Spring 1995, pp. 58–68.
"Propagation Measurements and Models for Wireless Communications Channels;" J.B. Andersen et al., IEEE Communications Magazine, Jan. 1995, pp. 42–49.
"UHF Propagation Prediction for Wireless Personal Communications;" H.L. Bertoni et al., Proceedings of the IEEE, vol. 82, No. 9, Sep. 1994, pp. 1333–1359.
James and James, "Mathematics Dictionary", p. 266, Apr. 1992.

*Primary Examiner*—Reinhard J. Eisenzopf
*Assistant Examiner*—Marsha D. Banks-Harold
*Attorney, Agent, or Firm*—DeMont & Breyer, LLC; Jason Paul DeMont; Wayne S. Breyer

[57] ABSTRACT

Techniques for predicting RF signal propagation in indoor environments are disclosed. A typical technique comprises six distinct phases. In one phase, the mean wall separation, $\bar{d}$, of one floor of a building is estimated. In a second phase, a reflection coefficient, s, is estimated for the floor in general. In a third phase, a number of trial RF propagation measurements are made to gather empirical data about the RF propagation characteristics of the floor. In the fourth phase, the mean wall separation, $\bar{d}$, the reflection coefficient, s, and the trial RF propagation measurements are fit, using well-known techniques, into a wireless propagation model, such as $$P(r) = \frac{P_0}{2\pi D}\sqrt{\frac{\pi\xi}{2r}}\,e^{-r/\xi},$$

where P(r) is the measured or predicted power at a distance, r, from the transmitter, $$D = \xi^2\left[\sqrt{\left(\frac{s}{\bar{d}}\right)^2 + \left(\frac{1}{\xi}\right)^2} - \frac{s}{\bar{d}}\right]$$

and $\xi$ is the parameter that is fit to the empirical data. In the fifth phase the wireless propagation model is used to predict the RF signal strength throughout the floor from a base station at a given location, and in the six phase one or more base stations are installed in the building based on the results predicted by the wireless propagation model. The fifth and sixth phases can be thereafter repeated for other building with sufficiently similar characteristics.

16 Claims, 3 Drawing Sheets

BULK DIFFUSION

BOUNDARY DIFFUSION

METHOD AND APPARATUS FOR MODELING THE PROPAGATION OF WIRELESS SIGNALS IN BUILDINGS

FIELD OF THE INVENTION

The present invention relates to wireless telecommunications in general, and, more particularly, to a technique for modeling the propagation of wireless signals in buildings.

BACKGROUND OF THE INVENTION

Indoor wireless telecommunications has been the subject of intense investigation in recent years for both voice and data communication. One particular area of investigation is how to ensure the adequate propagation of a wireless signal from a base station to a wireless terminal through a typical indoor environment. The walls, furniture and other objects in a typical indoor environment scatter the wireless signal and thus produce a complex multi path channel in which the signal propagation characteristics are substantially more difficult to predict than those in outdoor contexts.

Typically, the signal propagation characteristics are considered when designing and installing an indoor wireless telecommunications system. In particular, the signal propagation characteristics are advantageously considered when determining how many base stations are needed to provide coverage for a building and where in the building those base stations should be located. Because base stations are typically expensive to install and operate, it is advantageous to be able to determine how to provide the necessary coverage for the building with the fewest number of base stations. To do this, several techniques have been developed for modeling the propagation of wireless signals indoors.

One technique in the prior art for measuring and modeling indoor signal propagation is adapted from the power-law decay model used in modeling outdoor environments. The power-law decay model assumes that the base station s antenna is high above the ground and that there is line-of-sight propagation to the wireless terminal. In this case, the mean power, P, received at the wireless terminal decays in inverse proportion to the square of the distance from the transmitter, $$P \propto \frac{1}{r^2}, \quad \text{(Eq. 1)}$$

up to some break-point. Beyond that breakpoint, the mean power at the wireless terminal decays in inverse proportion to the fourth power of the distance from the transmitter:

$$P \propto \frac{1}{r^4} \quad \text{(Eq. 2)}$$

The location of the break-point is determined by the location at which the ground bounce signal interferes with the line-of-sight signal. For indoor environments, Equation 1 has been adapted to Equation 3, where γ is fit to empirical trial measurements of the building of interest, in well-known fashion:

$$P \propto \frac{1}{r^\gamma} \quad \text{(Eq. 3)}$$

Unfortunately, Equation 3 typically does not provide a satisfactory model of the building of interest for aiding a designer in designing a wireless system for the building. The use of Equation 3 does, however, have advantages. First, the empirical data needed to fit γ is easily obtainable,, and second the fitting of γ and subsequent use of Equation 3 as a model is computationally straightforward.

H. L. Bertoni, W. Honcharenko, L. R. Maciel, and H. H. Xia, "UHF Propagation Prediction for Wireless Personal Communications, " Proc. of the IEEE, vol. 82, pp. 1333–1359 (September 1994); and J. B. Anderson, T. S. Rappaport, and S. Yoshida, "Propagation Measurements and Models for Wireless Communications Channels, " IEEE Communic. Mag., pp. 42–49 (January 1995) both provide an excellent overview of wireless propagation models in the prior art.

Another technique in the prior art for measuring and modeling indoor RF propagation is adapted from ray-tracing techniques, as taught by S. J. Fortune et al., U.S. Pat. No. 5,450,615, issued Sep. 12, 1995. According to this technique the RF propagation within a building is predicted by modeling an RF signal as a plurality of rays that pass through objects in the building or are reflected off of objects in the building or both. An advantage of this technique is that the resulting wireless propagation model can be very effective for modeling the RF propagation characteristics of the building of interest. There are, however, two disadvantages of this technique. The first disadvantage is that the technique requires an extremely detailed floorplan of the building of interest including the major RF obstacles in the building. For a typical office building, this can be burdensome. The second disadvantage is that the technique is computationally intense, and, therefore, typically requires fast, expensive computers.

Therefore, there exists the need for a wireless propagation model that is effective, that does not require a great deal of empirical data about the building to be gathered and that can be reasonably implemented on a typical desktop computer.

SUMMARY OF THE INVENTION

Some embodiments of the present invention are capable of modeling the propagation of RF signals in an indoor environment without the restrictions and disadvantages of techniques in the prior art. In particular, some embodiments are extremely effective, yet require only a modest amount of architectural information and computational power.

These advantages may be found in some embodiments of the present invention that comprise six distinct phases. In one phase, the mean wall separation, $\bar{d}$, of one floor of a building is estimated. In a second phase, a reflection coefficient, s, is estimated for the floor in general. In a third phase, a number of trial RF propagation measurements are made to gather empirical data about the RF propagation characteristics of the floor. In the fourth phase, the mean wall separation, $\bar{d}$, the reflection coefficient, s, and the trial RF propagation measurements are fit, using well-known techniques, into a wireless propagation model, such as $$P(r) = \frac{P_0}{2\pi D} \sqrt{\frac{\pi \xi}{2r}} e^{-r/\xi},$$

where P(r) is the measured or predicted power at a distance, r, from the transmitter $$D = \xi^2 \left[ \sqrt{\left(\frac{s}{\bar{d}}\right)^2 + \left(\frac{1}{\xi}\right)^2} - \frac{s}{\bar{d}} \right]$$

and ξ is the parameter that is fit to the empirical data. In the fifth phase the wireless propagation model is used to predict the RF signal strength throughout the floor from a base station at a given location, and in the six phase one or more base stations are installed in the building based on the results predicted by the wireless propagation model. The fifth and sixth phases can be thereafter repeated for other building with sufficiently similar characteristics.

DETAILED DESCRIPTION

Figure 1:
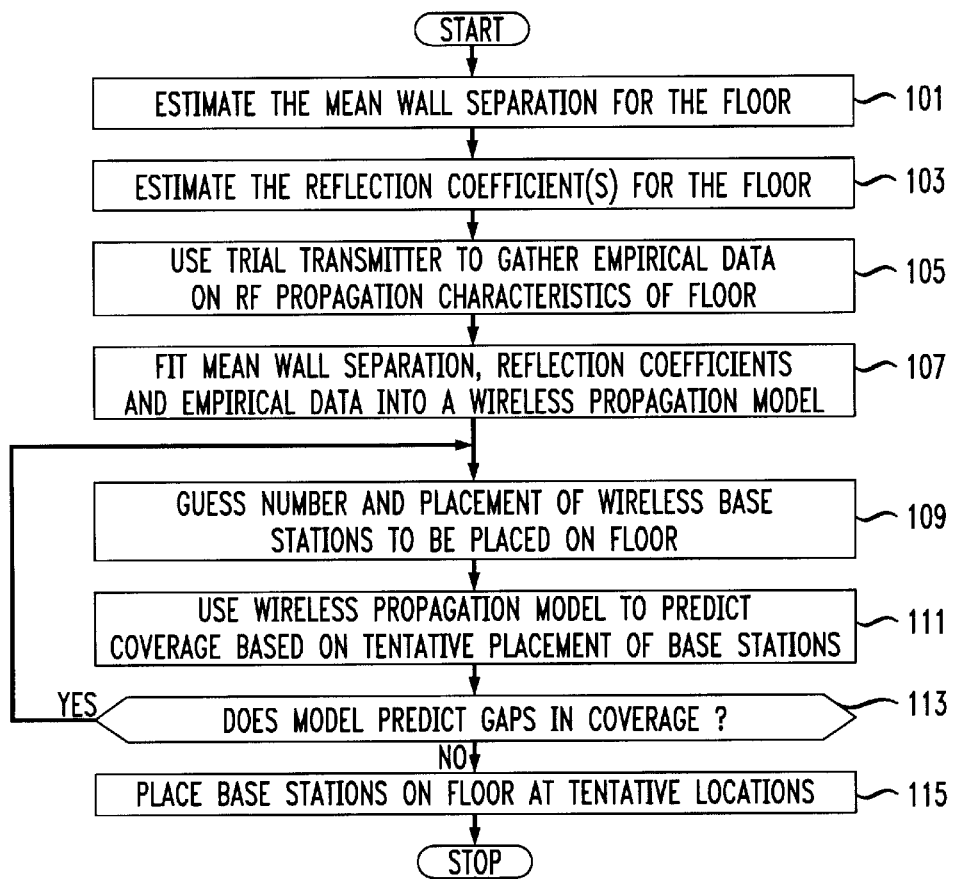
FIG. 1 depicts a flowchart of the illustrative embodiment of the present invention.

FIG. 1 depicts a flowchart of the illustrative embodiment of the present invention, which can employ one of the wireless propagation models described below to assist in determining the number and placement of wireless base stations in a building. Each of the wireless propagation models described below belong to one of three classes. The three classes are: (1) the Bulk Diffusion Models, (2) the Boundary Diffusion Models, and (3) the Statistical Boltzmann Models.

The remainder of the detailed description teaches how each of the wireless propagation models is applied to one floor of an illustrative multi-story office building to predict that the signal strength from one or more base stations on the floor is at least −65 dBm everywhere on the floor. Although it will be clear to those skilled in the art how to apply each wireless propagation model to an entire multi-story building as a whole, the building materials between adjacent floors of a multi-story building typically attenuate RF signals to the extent that there is little coverage provided by a base station on one floor to a wireless terminal on another floor. Therefore, it is advantageous to apply the illustrative embodiment of the present invention to a multi-story building one floor at a time.

Figure 2:
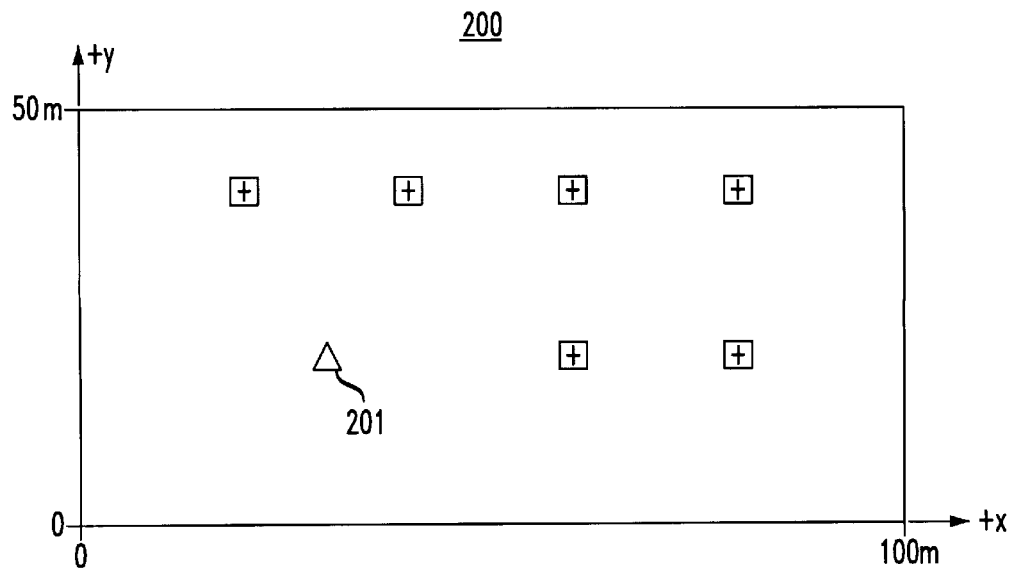
FIG. 2 depicts a outline of one floor of a typical office building wherein the location of a trial transmitter is represented by a triangle and each location at which an empirical signal strength measurement is made is represented by a square.

FIG. 2 depicts an outline of the outer walls of one floor, floor 200, of the illustrative office building. As defined by the outer walls, floor 200 is rectangular and 100 meters long in the x-direction and 50 meters long in the y-direction. Although the outer wall of the building is rectangular, it will be clear to those skilled in the art how to make and use embodiments of the present invention for any size or shape building.

Referring to step 101 in FIG. 1, the mean wall separation of the floor of interest is estimated. Depending on which wireless propagation model is to be used, either an isotropic estimate or an anisotropic estimate is made.

The Bulk Diffusion Models use an isotropic estimate of the mean wall separation, $\bar{d}$, and the Boundary Diffusion Models and the Statistical Boltzmann Models advantageously use anisotropic estimates, $\bar{d}_x$ and $\bar{d}_y$, each in orthogonal directions.

In accordance with the illustrative embodiment, a detailed floorplan of floor 200 is not needed to estimate the mean wall separation. Instead, the mean wall separation can be estimated by measuring the dimensions of a few typical rooms in floor 200, in well-known fashion. Illustratively, the isotropic mean wall separation, $\bar{d}$, of floor 200 is 4.5 meters, and the anisotropic mean wall separation in the x-direction, $\bar{d}_x$, of floor 200 is 4 meters and the mean wall separation in the y-direction, $\bar{d}_y$, is 5 meters.

At step 103 in FIG. 1, one or more reflection coefficients are estimated for the floor of interest. Each reflection coefficient indicates what percentage of the energy of an RF signal, at the frequency of interest, is typically reflected off of a wall in comparison to the amount of energy that is transmitted through the wall.

The Bulk Diffusion Models require a single isotropic estimate of reflection, s, which is based on the type of building materials used in the construction of both the interior and exterior walls of floor 200. It will be clear to those skilled in the art how to estimate the isotropic reflection coefficient, s, for a given set of building materials. Illustratively, the interior walls of floor 200 are constructed of sheetrock and the exterior walls of floor 200 are glass. Therefore, a reasonable estimate of reflection, s, is 0.4, as is well-known in the art.

The Boundary Diffusion Models and the Statistical Boltzmann Models advantageously require an anisotropic estimate of reflection, s(θ), of the interior walls and an anisotropic estimate of reflection, B(θ), of the exterior walls. The anisotropic nature of these estimates consider that the amount of energy in an RF signal that is reflected from a wall depends on the angle between the direction of propagation and the direction normal to the wall at the point of contact. Separate estimates of reflection are advantageously made for both the interior walls and for the exterior walls so that the typical disparity in their construction can be considered. It will be clear to those skilled in the art how to estimate values for s(θ) and B(θ) for given building materials. When, as in this example, the interior walls are mostly sheetrock and the exterior walls are glass, s (θ) can be reasonably estimated as $\sin^2 \theta$ and B(θ) reasonably estimated as $0.4 + 0.6\sin^2\theta$, where θ is the angle between the direction of propagation and the direction normal to the wall at the point of contact.

At step 105, empirical measurements of RF propagation throughout floor 200 are made which are advantageously used to help create the wireless propagation model of floor 200. Advantageously, a trial transmitter is placed at a location $x_0$, $y_0$, on floor 200 that radiates a trial signal at power, $P_0$, at the frequency of interest. In the illustrative embodiment, the power, $P_0$, of the trial transmitter is +20 dBm. Advantageously, the location, $x_0$, $y_0$, is asymmetric with respect to the exterior walls of the building. In FIG. 2, trial transmitter 201 is shown at location $x_0=30$, $y_0=20$.

Advantageously, the strength of the trial signal, $P_i$, is measured with a signal strength detector at n locations, $x_i$, $y_i$, for i =1 to n. Advantageously, the n locations are asymmetrically located around the trial transmitter and are fairly distributed throughout floor 200.

When reasonable care has been taken to estimate the mean wall separation and reflection coefficient(s) for floor 200, the trial signal, $P_i$, need be only measured at a few locations. In contrast, when reasonable care has not been taken in estimating the mean wall separation and reflection coefficient(s) for floor 200, the trial signal, $P_i$, should be measured at a larger number of locations to compensate. Furthermore, is no estimate of the mean wall separation or the reflection coefficient(s) is made for the building of interest, and estimates of a typical building are used instead, then measuring the trial signal, $P_i$, at a large number of locations may provide enough empirical data to enable the creation of a satisfactory wireless propagation model for the floor of interest. It will be clear to those skilled in the art how to set up the trial transmitter and how to measure the strength of the trial signal at various locations on floor 200.

For the illustrative floor 200, Table 1 lists the n=6 locations at which the trial signal, $P_i$, is measured and the resulting measurements.

TABLE 1

Empirical Signal Strength Measurements

| i | $x_i$ | $y_i$ | $P_i$ |
|---|---|---|---|
| 1 | 20 | 40 | −50 dBm |
| 2 | 40 | 40 | −55 dBm |
| 3 | 60 | 40 | −65 dBm |
| 4 | 80 | 40 | −80 dBm |
| 5 | 60 | 20 | −55 dBm |
| 6 | 80 | 20 | −65 dBm |

FIG. 2 shows the location of trial transmitter 201 and the respective locations at which the trial signal was measured are depicted by squares in floor 200.

At step 109, the mean wall separation, the reflection coefficient(s) and the empirical data from step 107 are fit into one or more of the wireless propagation models.

Bulk Diffusion Models—Two specific Bulk Diffusion Models are presented, both of which are isotropic. The first Bulk Diffusion Model is based on:

$$P(r) = \frac{P_0}{2\pi D}\sqrt{\frac{\pi\xi}{2r}}\, e^{-r/\xi} \qquad \text{(Eq. 4)}$$

wherein P(r) is the measured or predicted power at a distance, r, from the transmitter, $$D = \xi^2\left[\sqrt{\left(\frac{s}{\bar{d}}\right)^2 + \left(\frac{1}{\xi}\right)^2} - \frac{s}{\bar{d}}\right]$$

and $\xi$ is the parameter that is fit to the data in Table 1, in well-known fashion. In other words, Equation 4 is at least-squares regression equation of P(r) on r and the mean wall separation, $\bar{d}$, the reflection coefficient, s, and the empirical data in Table 1 are used to find the best fit value for $\xi$. For the values $P_0$+20 dBm, $\bar{d}$=4.5, s=0.4 and the values in Table 1, the best fit value for $\xi$ is 24. Alternatively, when the characteristic decay length, $\xi$, is large $$D = \frac{\bar{d}}{2s}$$

can be used.

The second Bulk Diffusion Model is based on:

$$P(r) = \frac{P_0}{2\pi D} K_0\left(\frac{r}{\xi}\right) \qquad \text{(Eq. 5)}$$

wherein P(r) is the measured or predicted power at a distance, r, from the transmitter, $$D = \xi^2\left[\sqrt{\left(\frac{s}{\bar{d}}\right)^2 + \left(\frac{1}{\xi}\right)^2} - \frac{s}{\bar{d}}\right],$$

, $K_0$ is a modified Bessel function and $\xi$ is the parameter that is fit to the data in Table 1, in well-known fashion. Alternatively, when the characteristic decay length, $\xi$, is large $$D = \frac{\bar{d}}{2s}$$

can be used.

Boundary Diffusion Models—Two specific Boundary Diffusion Models are presented, both of which are anisotropic. In general, the Boundary Diffusion Models are expected to be more effective than the Bulk Diffusion Models. The first Boundary Diffusion Model is based on the solution to the partial differential equation:

$$D_x(\theta)\frac{\partial^2 P(x, y, \theta)}{\partial x^2} + D_y(\theta)\frac{\partial^2 P(x, y, \theta)}{\partial y^2} - \qquad \text{(Eq. 6)}$$
$$\frac{P(x, y, \theta)}{\xi_1} + P_0\delta(x - x_0)\delta(y - y_0) = 0$$

wherein $x_0$, $y_0$ is the location of the transmitter, $P(x,y,\theta)$ is the measured or predicted power at location x, y, propagating in the direction $\theta$ with respect to the x-axis, $\delta$ is the Dirac delta function, $$D_x(\theta) = \left(\left[\frac{2s(\theta)}{\bar{d}_x|\cos\theta|} + \frac{1}{\xi_1\cos^2\theta}\right]\right)^{-1},$$

$$D_y(\theta) = \left(\left[\frac{2s(\pi/2 - \theta)}{\bar{d}_y|\sin\theta|} + \frac{1}{\xi_1\sin^2\theta}\right]\right)^{-1},$$

and $\xi_1$ is the parameter to be fit to the data in Table 1, in well-known fashion; with the boundary condition $$\hat{n} \cdot \vec{\nabla} P(x, y, \theta) = -\frac{K_{ext}}{\left|\hat{n} \cdot \vec{l}_{wall}(\theta)\right|} P(x, y, \theta),$$

wherein $$K_{ext} = \frac{2(1 - B(\theta))}{1 + B(\theta)(1 - 2s(\theta))},$$

$$\vec{l}_{wall}(\theta) = \begin{bmatrix} \dfrac{\bar{d}_x}{s(\theta)|\cos\theta|} \\ \dfrac{\bar{d}_y}{s(\pi/2-\theta)|\sin\theta|} \end{bmatrix}$$

and $\hat{n}$ is the unit vector normal to the boundary at the boundary point x, y. For the values, $\bar{d}_x$=4 meters, $\bar{d}_y$=5 meters, $s(\theta)=\sin^2\theta$, $B(\theta)=0.4+0.6\sin^2\theta$ and the values in Table 1, the best fit value for $\xi_1$ is 16.

Alternatively, when the characteristic decay length $\xi_1$ is large, $$D_x(\theta) = \frac{\bar{d}_x|\cos\theta|}{2s(\theta)}$$

and $$D_y(\theta) = \frac{\bar{d}_y|\sin\theta|}{2s(\pi/2-\theta)}$$

can be used.

The second Boundary Diffusion Model is based on the solution to the partial differential equation:

$$D_x(\theta)\frac{\partial^2 P(x,y,\theta)}{\partial x^2} + D_y(\theta)\frac{\partial^2 P(x,y,\theta)}{\partial y^2} - \frac{P(x,y,\theta)}{\xi_1} - \frac{P(x,y,\theta)-\langle P(x,y,\theta)\rangle}{\xi_2} + P_0\delta(x-x_0)\delta(y-y_0) = 0 \quad \text{(Eq. 7)}$$

wherein $x_0$, $y_0$ is the location of the transmitter, $P(x,y,\theta)$ is the measured or predicted power at location x, y, propagating in the direction $\theta$ with respect to the x-axis, $\delta$ is the Dirac delta function, $$D_x(\theta) = \left[\frac{2s(\theta)}{\bar{d}_x|\cos\theta|} + \frac{1}{\xi_1\cos^2\theta} + \frac{1}{\xi_2\cos^2\theta}\right]^{-1},$$

$$D_y(\theta) = \left[\frac{2s(\pi/2-\theta)}{\bar{d}_y|\sin\theta|} + \frac{1}{\xi_1\sin^2\theta} + \frac{1}{\xi_2\sin^2\theta}\right]^{-1},$$

$$\langle P(x,y,\theta)\rangle = \frac{1}{2\pi}\int_0^{2\pi} P(x,y,\theta)d\theta$$

and $\xi_1$ and $\xi_2$ are parameters to be fit to the data in Table 1, in well-known fashion; with the boundary condition $$\hat{n}\cdot\vec{\nabla}P(x,y,\theta) = -\frac{K_{ext}}{\left|\hat{n}\cdot\vec{l}_{wall}(\theta)\right|}P(x,y,\theta),$$

wherein $$K_{ext} = \frac{2(1-B(\theta))}{1+B(\theta)(1-2s(\theta))} \quad \text{and}$$

$$\vec{l}_{wall}(\theta) = \begin{bmatrix} \dfrac{\bar{d}_x}{s(\theta)|\cos\theta|} \\ \dfrac{\bar{d}_y}{s(\pi/2-\theta)|\sin\theta|} \end{bmatrix}.$$

Alternatively, when the characteristic decay length $\xi_1$ and $\xi_2$ are large, $$D_x(\theta) = \frac{\bar{d}_x|\cos\theta|}{2s(\theta)} \quad \text{and}$$

$$D_y(\theta) = \frac{\bar{d}_y|\sin\theta|}{2s(\pi/2-\theta)}$$

can be used.

The solution to equation 6 or 7 yields the anisotropic function $P(x,y,\theta)$ which predicts the power at location x, y, propagating in the direction $\theta$ with respect to the x-axis. Each final wireless propagation model, $P(x,y)$, is advantageously the sum of all the power traveling in all directions at location x,y. Therefore, the anisotropic function $P(x,y,\theta)$ is related to the total power $$P(x,y) = \int_0^{2\pi} P(x,y,\theta)d\theta.$$

Statistical Boltzmann Models—Two specific Statistical Boltzmann Models are presented, both of which are anisotropic. In general, the Statistical Boltzmann Models are expected to be more effective than either the Bulk Diffusion Models or the Boundary Diffusion Models, especially for buildings that have an irregular shape. The first Statistical Boltzmann Model is based on the solution to the partial differential equation:

$$\hat{\theta}\cdot\vec{\nabla}P(x,y,\theta) + P_0\delta(x-x_0)\delta(y-y_0) + \frac{s(\theta)|\cos\theta|}{\bar{d}_x}[P(x,y,\theta)-P(x,y,\pi-\theta)] + \frac{s(\pi/2-\theta)|\sin\theta|}{\bar{d}_y}[P(x,y,\theta)-P(x,y,-\theta)] + \frac{P(x,y,\theta)}{\xi_1} = 0 \quad \text{(Eq. 8)}$$

wherein $x_0$, $y_0$ is the location of the transmitter, $P(x,y,\theta)$ is the measured or predicted power at location x, y, propagating in the direction $\theta$ with respect to the x-axis, $\delta$ is the Dirac delta function, $\hat{\theta}$ is a unit vector in the direction $\theta$ and $\xi_1$ is parameter to be fit to the data in Table 1, in well-known fashion; with the boundary condition: $P(x,y,\theta)=B(\theta)P(x,y,\phi)$, where $\phi$ is angle of the vector $\hat{\theta}-2\hat{n}(\hat{n}\cdot\hat{\theta})$, wherein $\hat{n}$ is a unit vector normal to the boundary at the boundary point x, y.

The second Statistical Boltzmann Model is based on the solution to the partial differential equation:

$$\hat{\theta}\cdot\vec{\nabla}P(x,y,\theta) + P_0\delta(x-x_0)\delta(y-y_0) + \frac{s(\theta)|\cos\theta|}{\bar{d}_x}[P(x,y,\theta)-P(x,y,\pi-\theta)] + \frac{s(\pi/2-\theta)|\sin\theta|}{\bar{d}_y}[P(x,y,\theta)-P(x,y,-\theta)] + \quad \text{(Eq. 9)}$$

-continued $$\frac{P(x, y, \theta)}{\xi_1} + \frac{P(x, y, \theta) - \langle P(x, y, \theta) \rangle}{\xi_2} = 0$$

wherein $x_0$, $y_0$ is the location of the transmitter, $P(x,y,\theta)$ is the measured or predicted power at location x, y, propagating in the direction $\theta$ with respect to the x-axis, $\delta$ is the Dirac delta function, $\hat{\theta}$ is a unit vector in the direction $\theta$, $$\langle P(x, y, \theta) \rangle = \frac{1}{2\pi} \int_0^{2\pi} P(x, y, \theta) d\theta$$

and $\xi_1$ and $\xi_2$ are parameters to be fit to the data in Table 1, in well-known fashion; with the boundary condition: $P(x,y,\theta)=B(\theta)P(x,y,\phi)$, where $\phi$ is angle of the vector $\hat{\theta}-2\hat{n}(\hat{n}\cdot\hat{\theta})$, wherein $\hat{n}$ is a unit vector normal to the boundary at the boundary point x,y.

Each solution to equation 8 or 9 yields the anisotropic function $P(x,y,\theta)$ which predicts the power at location x,y, propagating in the direction $\theta$ with respect to the x-axis. The final wireless propagation model, $P(x,y)$, is advantageously the sum of all the power traveling in all directions at location x,y. Therefore, the anisotropic function $P(x,y,\theta)$ is related to the total power $$P(x, y) = \int_0^{2\pi} P(x, y, \theta) d\theta.$$

When step 107 is complete, a wireless propagation model, $P(x,y)$, for floor 200 is complete.

At step 109, a guess is made as to the potential location for placing a wireless base station on floor 200. For economic reasons, it is advantageous if all of floor 200 can be covered with a single base station. If all of floor 200 can be covered with a single base station, it is reasonable to guess that the best location for that base station would be the exact center of floor 200 ($x_0=50$, $y_0=25$).

At step 111, the wireless propagation model, $P(x, y)$, is used to predict the mean power throughout floor 200 with the base station at location $x_0$, $y_0$, in well-known fashion.

Figure 3:
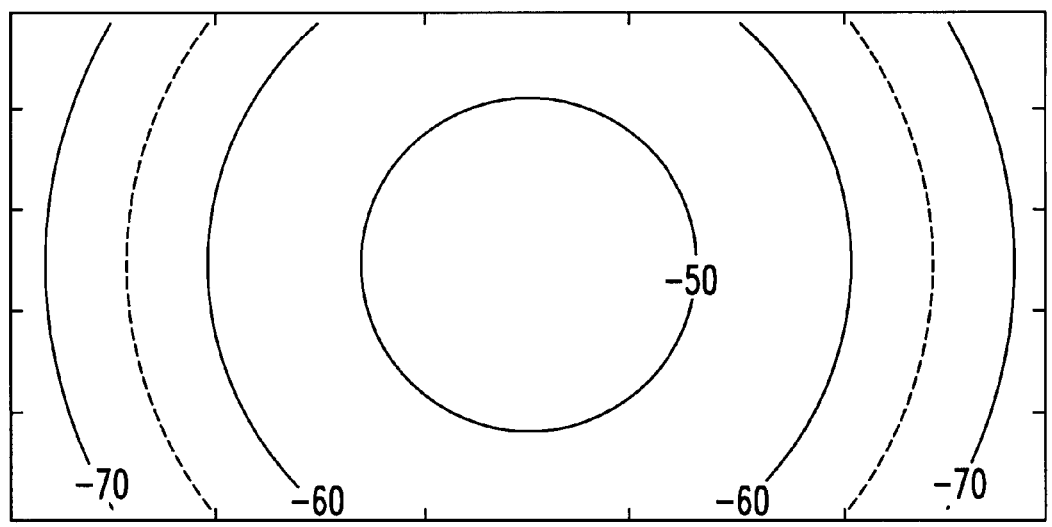
FIG. 3 depicts a map of the wireless coverage for the floor of FIG. 2 from a single base station according to one wireless propagation model.

FIG. 3 depicts a topographical map of floor 200 that predicts the signal strength (in dBm) throughout floor 200 based on a single base station at $x_0 50, y_0=25$ and based on the first Bulk Diffusion Model of Equation 4:

$$P(r) = \frac{P_0}{5.76} \sqrt{\frac{1}{r}} e^{-r/24}, \text{ where}$$

$$r = \sqrt{(x_0 - x)^2 + (y_0 - y)^2}.$$

As discussed above, adequate coverage is achieved in the illustrative example when the signal strength in all of floor 200 is above −65 dBm. As can be seen in FIG. 3, the first Bulk Diffusion Model predicts that there will be gaps in coverage at the ends of floor 200 if only one base station is used.

Figure 4:
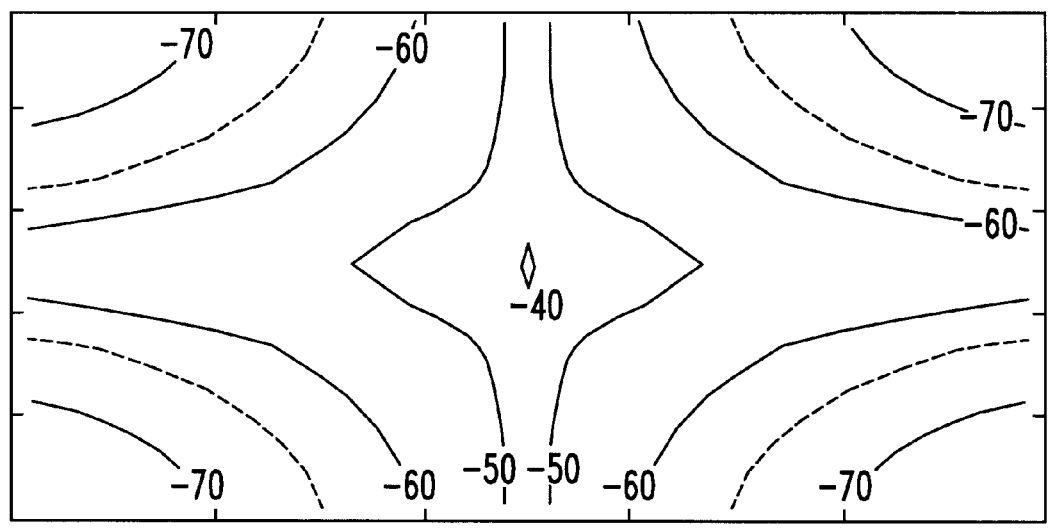
FIG. 4 depicts a map of the wireless coverage for the floor of FIG. 2 from a single base station according to a second wireless propagation model.

For comparison, FIG. 4 depicts a topological map of floor 200 that predicts the signal strength (in dBm) throughout floor 200 based on a single base station at $x_0=50, y_0=25$ and based on the first Boundary Diffusion Model of Equation 6. As can be seen in FIG. 4, the first Boundary Diffusion Model predicts substantially different isopower lines than does the first Bulk Diffusion Model, but both predict that there will be gaps in coverage at the ends of floor 200 if only one base station is used.

at Step 113, the question is posed whether the wireless propagation model predicts regions with insufficient coverage. Although FIG. 3 and FIG. 4 predict different signal strengths, both predict that a single base station is insufficient to cover floor 200, and, therefore, control passes back to step 109.

At step 109, another guess is made as to the possible locations for placing base stations on floor 200. For economical reasons, it is advantageously if floor 200 can be covered with two base stations. If two base stations are to cover floor 200, a reasonable guess is to locate each at the center of one half of floor 200 i.e., one base station at $x_0=25$, $y_0=25$ and the second base station at $x_0=75, y_0=25$).

Figure 5:
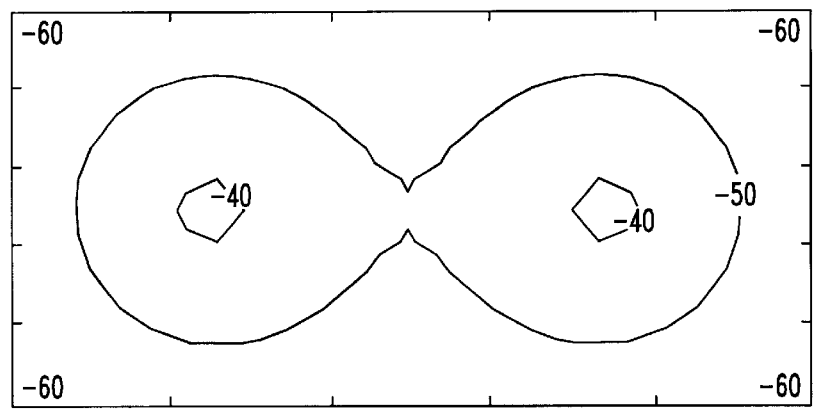
FIG. 5 depicts a map of the wireless coverage for the floor of FIG. 2 from two base stations according to the first wireless propagation model.
Figure 6:
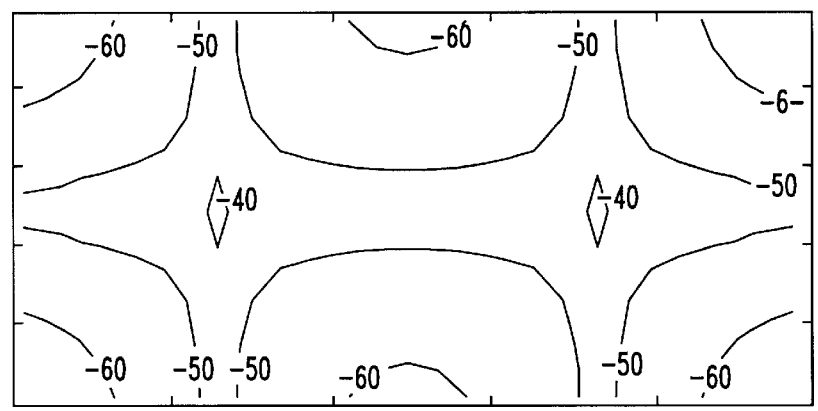
FIG. 6 depicts a map of the wireless coverage for the floor of FIG. 2 from two base stations according to the second wireless propagation model.

At step 111, the wireless propagation model, $P(x, y)$, is used to predict the mean power throughout floor 200 with the base stations at $x_0=25$, $y_0=25$ and $x_0=75, y_0=25$, where the total power at each location on floor 200 is equal to the sum of the power from each base station. FIG. 5 depicts a map that predicts the signal strength throughout floor 200 based on the first Bulk Diffusion Model and FIG. 6 depicts a similar map based on the first Boundary Diffusion Model.

at Step 113, the question is posed whether the wireless propagation model predicts regions with insufficient coverage. Although FIG. 5 and FIG. 6 predict substantially different isopower lines, both models predicts that two base stations (one at $x_0=25$, $y_0=25$ and one at $x_0=75$, $y_0=25$) provide sufficient coverage for floor 200.

Figure 7:
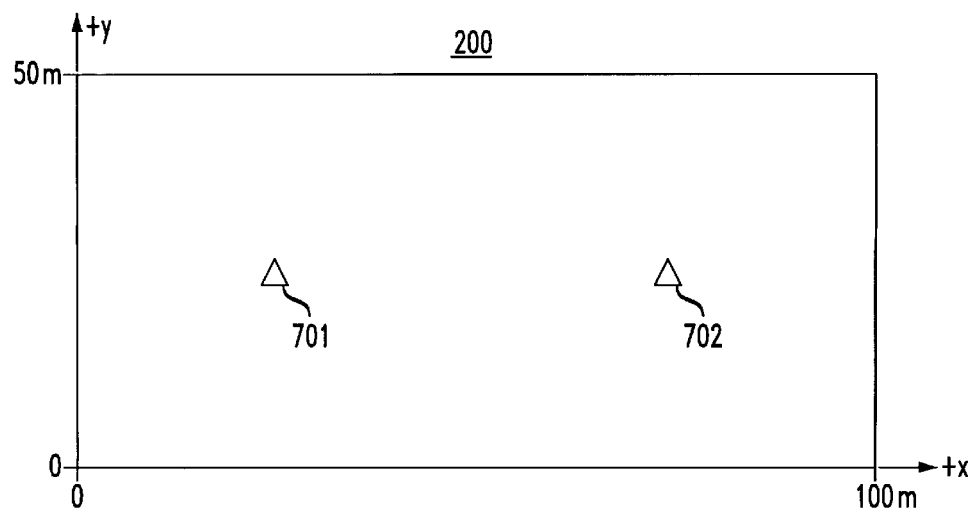
FIG. 7 depicts an outline of the floor in FIG. 2 and the location of two base stations that have been placed on that floor.

At step 115, two wireless base stations are placed at $x_0=25$, $y_0=25$ and $x_0=75$, $y_0=25$ in floor 200. FIG. 7 depicts floor 200 with base station 701 placed at $x_0=25$, $y_0=25$ and base station 702 at $x_0=75$, $y_0=25$.

It is to be understood that the above-described embodiments are merely illustrative of the present invention and that many variations may be devised by those skilled in the art without departing from the scope of the invention. It is therefore intended that such variations be included within the scope of the following claims.

What is claimed is:

1. A method for placing a wireless base station inside a building, said method comprising:

estimating a mean wall separation, $\bar{d}$, for a floor of said building;

radiating a trial signal with a transmit power, $P_0$, from a transmitter;

measuring a received power $P_1$ of said trial signal at a distance, $r_1$, from said transmitter;

estimating a reflection coefficient, s, for said floor;

creating a wireless propagation model based on said mean wall separation, $\bar{d}$, said transmit power, $P_0$, said received power $P_1$, said distance, $r_1$, said reflection coefficient, s, and on $$P(r) = \frac{P_0}{2\pi D} \sqrt{\frac{\pi \xi}{2r}} e^{-r/\xi},$$

wherein $$D = \frac{\bar{d}}{2s}$$

and $\xi$ is a fit parameter; and placing said wireless base station in said building at a location based on said wireless propagation model.

2. A method for placing a wireless base station inside a building, said method comprising:

estimating a mean wall separation, $\bar{d}$, for a floor of said building;

radiating a trial signal with a transmit power, $P_0$, from a transmitter;

measuring a received power $P_1$ of said trial signal at a distance, $r_1$, from said transmitter;

estimating a reflection coefficient, s, for said floor;

creating a wireless propagation model based on said mean wall separation, $\bar{d}$, said transmit power, $P_0$, said received power $P_1$, said distance, $r_1$, said reflection coefficient, s, and on $$P(r) = \frac{P_0}{2\pi D} K_0\left(\frac{r}{\xi}\right),$$

wherein $$D = \frac{\bar{d}}{2s},$$

$K_0$ is a modified Bessel function and $\xi$ is a fit parameter; and placing said wireless base station in said building at a location based on said wireless propagation model.

3. A method for placing a wireless base station inside a building, said method comprising:

estimating a mean wall separation, $\bar{d}$, for a floor of said building;

radiating a trial signal with a transmit power, $P_0$, from a transmitter;

measuring a received power $P_1$ of said trial signal at a distance, $r_1$, from said transmitter;

estimating a reflection coefficient, s, for said floor;

creating a wireless propagation model based on said mean wall separation, $\bar{d}$, said transmit power, $P_0$, said received power $P_1$, said distance, $r_1$, said reflection coefficient, s, and on $$P(r) = \frac{P_0}{2\pi D} \sqrt{\frac{\pi \xi}{2r}}\, e^{-r/\xi},$$

wherein $$D = \xi^2 \left[ \sqrt{\left(\frac{s}{\bar{d}}\right)^2 + \left(\frac{1}{\xi}\right)^2} - \frac{s}{\bar{d}} \right]$$

and $\xi$ is a fit parameter; and placing said wireless base station in said building at a location based on said wireless propagation model.

4. A method for placing a wireless base station inside a building, said method comprising:

estimating a mean wall separation, $\bar{d}$, for a floor of said building;

radiating a trial signal with a transmit power, $P_0$, from a transmitter;

measuring a received power $P_1$ of said trial signal at a distance, $r_1$, from said transmitter;

estimating a reflection coefficient, s, for said floor;

creating a wireless propagation model based on said mean wall separation, $\bar{d}$, said transmit power, $P_0$, said received power $P_1$, said distance, $r_1$, said reflection coefficient, s, and on $$P(r) = \frac{P_0}{2\pi D} K_0\left(\frac{r}{\xi}\right),$$

wherein $$D = \xi^2 \left[ \sqrt{\left(\frac{s}{\bar{d}}\right)^2 + \left(\frac{1}{\xi}\right)^2} - \frac{s}{\bar{d}} \right],$$

$K_0$ is a modified Bessel function and $\xi$ is a fit parameter; and placing said wireless base station in said building at a location based on said wireless propagation model.

5. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY the number and location of said wireless base station or stations is based on a wireless propagation model that involves estimation of a mean wall separation, $\bar{d}$, estimation of a mean reflection coefficient, s, for said given floor, said transmit power, $P_0$, said received power $P_1$, said distance, $r_1$, and on $$P(r) = \frac{P_0}{2\pi D} \sqrt{\frac{\pi \xi}{2r}}\, e^{-r/\xi},$$

wherein $$D = \frac{\bar{d}}{2s}$$

and $\xi$ is a fit parameter.

6. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY the number and location of said wireless base station or stations is based on a wireless propagation model that involves estimation of a mean wall separation, $\bar{d}$, estimation of a mean reflection coefficient, s, for said given floor, said transmit power, $P_0$, said received power $P_1$, said distance, $r_1$, and on $$P(r) = \frac{P_0}{2\pi D} K_0\left(\frac{r}{\xi}\right),$$

wherein $$D = \frac{\bar{d}}{2s},$$

$K_0$ is a modified Bessel function and $\xi$ is a fit parameter.

7. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY the number and location of said wireless base station or stations is based on a wireless propagation model that involves estimation of a mean wall separation, $\bar{d}$, estimation of a mean reflection coefficient, s, for said given floor, said transmit power, $P_0$, said received power $P_1$, said distance, $r_1$, and on $$P(r) = \frac{P_0}{2\pi D}\sqrt{\frac{\pi\xi}{2r}}\,e^{-r/\xi},$$

wherein $$D = \xi^2\left[\sqrt{\left(\frac{s}{\bar{d}}\right)^2 + \left(\frac{1}{\xi}\right)^2} - \frac{s}{\bar{d}}\right]$$

and $\xi$ is a fit parameter.

8. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY the number and location of said wireless base station or stations is based on a wireless propagation model that involves estimation of a mean wall separation, $\bar{d}$, estimation of a mean reflection coefficient, s, for said given floor, said transmit power, $P_0$, said received power $P_1$, said distance, $r_1$, and on $$P(r) = \frac{P_0}{2\pi D}K_0\!\left(\frac{r}{\xi}\right),$$

wherein $$D = \xi^2\left[\sqrt{\left(\frac{s}{\bar{d}}\right)^2 + \left(\frac{1}{\xi}\right)^2} - \frac{s}{\bar{d}}\right],$$

$K_0$ is a modified Bessel function and $\xi$ is a fit parameter.

9. A method for placing a wireless base station inside a building, said method comprising:

estimating a mean wall separation, $\bar{d}_x$, in a first direction for a floor of said building;

estimating a mean wall separation, $\bar{d}_y$, in a second direction for said floor, wherein said second direction is orthogonal to said first direction;

estimating an interior reflection coefficient, s($\theta$), for said floor, and wherein said wireless propagation model is also based on said reflection coefficient, s($\theta$);

estimating an exterior reflection coefficient, B($\theta$), for said floor;

radiating a trial signal with a transmit power, $P_0$, from a transmitter at a first location, $x_0,y_0$; and measuring a received power $P_1$ of said trial signal at a second location, $x_1$, $y_1$;

creating a wireless propagation model based on said mean wall separation, $\bar{d}_x$, in said first direction for said floor and said mean wall separation, $\bar{d}_y$, in said second direction for said floor, said transmit power, $P_0$, said first location, $x_0$, $y_0$, said received power $P_1$, and said second location, $x_1$, $y_1$, wherein said wireless propagation model $P(x,y,\theta)$, is based on the solution to the partial differential equation $$D_x(\theta)\frac{\partial^2 P(x,y,\theta)}{\partial x^2} + D_y(\theta)\frac{\partial^2 P(x,y,\theta)}{\partial y^2} - \frac{P(x,y,\theta)}{\xi_1} + P_0\delta(x-x_0)\delta(y-y_0) = 0$$

wherein $x_0$, $y_0$ is the location of the transmitter, P(x, y, $\theta$) is the measured or predicted power at location x, y, propagating in the direction $\theta$ with respect to the x-axis, $\delta$ is the Dirac delta function, $$D_x(\theta) = \left[\frac{2s(\theta)}{\bar{d}_x|\cos\theta|} + \frac{1}{\xi_1\cos^2\theta}\right]^{-1},$$

$$D_y(\theta) = \left[\frac{2s(\pi/2-\theta)}{\bar{d}_y|\sin\theta|} + \frac{1}{\xi_1\sin^2\theta}\right]^{-1},$$

and $\xi_1$ is a fit parameter, with the boundary condition $$\hat{n}\cdot\vec{\nabla}P(x,y,\theta) = -\frac{K_{ext}}{\left|\hat{n}\cdot\vec{l}_{wall}(\theta)\right|}P(x,y,\theta),$$

wherein $$K_{ext} = \frac{2(1-B(\theta))}{1+B(\theta)(1-2s(\theta))},\ \vec{l}_{wall}(\theta) = \begin{bmatrix}\dfrac{\bar{d}_x}{s(\theta)|\cos\theta|}\\[6pt]\dfrac{\bar{d}_y}{s(\pi/2-\theta)|\sin\theta|}\end{bmatrix}$$

and $\hat{n}$ is the unit vector normal to the boundary at the boundary point x,y;

placing said wireless base station in said building at a location based on said wireless propagation model.

10. A method for placing a wireless base station inside a building, said method comprising:

estimating a mean wall separation, $\bar{d}_x$, in a first direction for a floor of said building;

estimating a mean wall separation $\bar{d}_y$, in a second direction for said floor, wherein said second direction is orthogonal to said first direction;

estimating an interior reflection coefficient, s ($\theta$), for said floor, and wherein said wireless propagation model is also based on said reflection coefficient, s($\theta$);

estimating an exterior reflection coefficient, B($\theta$), for said floor;

radiating a trial signal with a transmit power, $P_0$, from a transmitter at a first location, $x_0$, $y_0$; and measuring a received power $P_1$ of said trial signal at a second location, $x_1,y_1$;

creating a wireless propagation model based on said mean wall separation, $\bar{d}_x$, in said first direction for said floor and said mean wall separation, $\bar{d}_y$, in said second direction for said floor, said transmit power, $P_0$, said first location, $x_0$, $y_0$, said received power $P_1$, and said second location, $x_1$, $y_1$, wherein said wireless propagation model, $P(x,y,\theta)$, is abased on the solution to the partial differential equation $$D_x(\theta)\frac{\partial^2 P(x, y, \theta)}{\partial x^2} + D_y(\theta)\frac{\partial^2 P(x, y, \theta)}{\partial y^2} - \frac{P(x, y, \theta)}{\xi_1} + P_0\delta(x-x_0)\delta(y-y_0) = 0$$

wherein $x_0$, $y_0$ is the location of the transmitter, $P(x,y,\theta)$ is the measured or predicted power at location x, y, propagating in the direction $\theta$ with respect to the x-axis $\delta$ is the Dirac delta function, $$D_x(\theta) = \frac{\overline{d}_x|\cos\theta|}{2s(\theta)}, D_y(\theta) = \frac{\overline{d}_y|\sin\theta|}{2s(\pi/2-\theta)},$$

and $\xi_1$ is a fit parameter, with the boundary condition $$\hat{n}\cdot\vec{\nabla}P(x, y, \theta) = -\frac{K_{ext}}{\left|\hat{n}\cdot\vec{l}_{wall}(\theta)\right|}P(x, y, \theta), \text{ wherein}$$

$$K_{ext} = \frac{2(1-B(\theta))}{1+B(\theta)(1-2s(\theta))}, \vec{l}_{wall}(\theta) = \begin{bmatrix} \frac{\overline{d}_x}{s(\theta)|\cos\theta|} \\ \frac{\overline{d}_y}{s(\pi/2-\theta)|\sin\theta|} \end{bmatrix}$$

and $\hat{n}$ is the unit vector normal to the boundary at the boundary point x, y;
placing said wireless base station in said building at a location based on said wireless propagation model.

11. A method for placing a wireless base station inside a building, said method comprising:
estimating a mean wall separation, $\overline{d}_x$, in a first direction for a floor of said building;
estimating a mean wall separation, $\overline{d}_y$, in a second direction for said floor, wherein said second direction is orthogonal to said first direction;
estimating an interior reflection coefficient, $s(\theta)$, for said floor, and wherein said wireless propagation model is also based on said reflection coefficient, $s(\theta)$;
estimating an exterior reflection coefficient, $B(\theta)$, for said floor;
radiating a trial signal with a transmit power, $P_0$, from a transmitter at a first location, $x_0$, $y_0$; and
measuring a received power $P_1$ of said trial signal at a second location, $x_1$, $y_1$;
creating a wireless propagation model based on said mean wall separation, $\overline{d}_x$, in said first direction for said floor and said mean wall separation, $\overline{d}_y$, in said second direction for said floor, said transmit power, $P_0$, said first location, $x_0$, $y_0$, said received power $P_1$, and said second location, $x_1$, $y_1$, wherein said wireless propagation model, $P(x,y,\theta)$, is based on the solution to the partial differential equation:

$$D_x(\theta)\frac{\partial^2 P(x, y, \theta)}{\partial x^2} + D_y(\theta)\frac{\partial^2 P(x, y, \theta)}{\partial y^2} - \frac{P(x, y, \theta)}{\xi_1} - \frac{P(x, y, \theta) - \langle P(x, y, \theta)\rangle}{\xi_2} + P_0\delta(x-x_0)\delta(y-y_0) = 0$$

$x_0$, $y_0$ is the location of the transmitter, $P(x,y,\theta)$ is the measured or predicted power at location x, y, propagating in the direction $\theta$, $\delta$ is the Dirac delta function, $$D_x(\theta) = \left[\frac{2s(\theta)}{\overline{d}_x|\cos\theta|} + \frac{1}{\xi_1\cos^2\theta} + \frac{1}{\xi_2\cos^2\theta}\right]^{-1},$$

$$D_y(\theta) = \left[\frac{2s(\pi/2-\theta)}{\overline{d}_y|\sin\theta|} + \frac{1}{\xi_1\sin^2\theta} + \frac{1}{\xi_2\sin^2\theta}\right]^{-1},$$

$$\langle P(x, y, \theta)\rangle = \frac{1}{2\pi}\int_0^{2\pi} P(x, y, \theta)d\theta$$

and $\xi_1$ and $\xi_2$ are fit parameters, with the boundary condition $$\hat{n}\cdot\vec{\nabla}P(x, y, \theta) = -\frac{K_{ext}}{\left|\hat{n}\cdot\vec{l}_{wall}(\theta)\right|}P(x, y, \theta),$$

wherein $$K_{ext} = \frac{2(1-B(\theta))}{1+B(\theta)(1-2s(\theta))} \text{ and}$$

$$\vec{l}_{wall}(\theta) = \begin{bmatrix} \frac{\overline{d}_x}{s(\theta)|\cos\theta|} \\ \frac{\overline{d}_y}{s(\pi/2-\theta)|\sin\theta|} \end{bmatrix};$$

placing said wireless base station in said building at a location based on said wireless propagation model.

12. A method for placing a wireless base station inside a building, said method comprising:
estimating a mean wall separation, $\overline{d}_x$, in a first direction for a floor of said building;
estimating a mean wall separation, $\overline{d}_y$, in a second direction for said floor, wherein said second direction is orthogonal to said first direction;
estimating an interior reflection coefficient, $s(\theta)$, for said floor, and wherein said wireless propagation model is also based on said reflection coefficient, $s(\theta)$;
estimating an exterior reflection coefficient, $B(\theta)$, for said floor;
radiating a trial signal with a transmit power, $P_0$, from a transmitter at a first location, $x_0$, $y_0$; and
measuring a received power $P_1$ of said trial signal at a second location, $x_1$, $y_1$;
creating a wireless propagation model based on said mean wall separation, $\overline{d}_x$, in said first direction for said floor and said mean wall separation, $\overline{d}_y$, in said second direction for said floor, said transmit power, $P_0$, said first location, $x_0$, $y_0$, said received power $P_1$, and said second location, $x_1$, $y_1$, wherein said wireless propagation model, $P(x,y,\theta)$, is based on the solution to the partial differential equation:

$$D_x(\theta)\frac{\partial^2 P(x, y, \theta)}{\partial x^2} + D_y(\theta)\frac{\partial^2 P(x, y, \theta)}{\partial y^2} - \frac{P(x, y, \theta)}{\xi_1} - \frac{P(x, y, \theta) - \langle P(x, y, \theta)\rangle}{\xi_2} + P_0\delta(x-x_0)\delta(y-y_0) = 0$$

wherein $x_0$, $y_0$ is the location of the transmitter, $P(x,y,\theta)$ is the measured or predicted power at location x, y, propagating in the direction $\theta$, $\delta$ is the Dirac delta function, $$D_x(\theta) = \frac{\overline{d}_x |\cos\theta|}{2s(\theta)}, D_y(\theta) = \frac{\overline{d}_y |\sin\theta|}{2s(\pi/2 - \theta)},$$

$$\langle P(x, y, \theta) \rangle = \frac{1}{2\pi} \int_0^{2\pi} P(x, y, \theta) d\theta$$

and $\gamma_1$ and $\gamma_2$ are fit parameters, with the boundary condition $$\hat{n} \cdot \vec{\nabla} P(x, y, \theta) = -\frac{K_{ext}}{\left| \hat{n} \cdot \vec{l}_{wall}(\theta) \right|} P(x, y, \theta), \text{ wherein}$$

$$K_{ext} = \frac{2(1 - B(\theta))}{1 + B(\theta)(1 - 2s(\theta))} \text{ and}$$

$$\vec{l}_{wall}(\theta) = \begin{bmatrix} \frac{\overline{d}_x}{s(\theta)|\cos\theta|} \\ \frac{\overline{d}_y}{s(\pi/2 - \theta)|\sin\theta|} \end{bmatrix};$$

placing said wireless base station in said building at a location based on said wireless propagation model.

13. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY a transmitter at a first location $x_0$, $y_0$ for radiating a trial signal with a transmit power, $P_0$; and a signal strength detector for measuring a received power $P_1$ of said trial signal at a second location $x_1$, $y_1$;

the number and location of said wireless base station or stations is based on a wireless propagation model that involves estimation of a mean wall separation, $\overline{d}_x$, in a first direction for said given floor and estimation of a mean wall separation, $\overline{d}_y$, in a second direction for said given floor, estimation of a interior reflection coefficient, $s(\theta)$, estimation of an exterior reflection coefficient, $B(\theta)$, for said given floor, said transmit power, $P_0$, said first location $x_0$, $y_0$, said received power $P_1$, said second location $x_1$, $y_1$, and on the solution to the partial differential equation $$D_x(\theta) \frac{\partial^2 P(x, y, \theta)}{\partial x^2} + D_y(\theta) \frac{\partial^2 P(x, y, \theta)}{\partial y^2} - \frac{P(x, y, \theta)}{\xi_1} + P_0 \delta(x - x_0) \delta(y - y_0) = 0$$

wherein $x_0$, $y_0$ is the location of the transmitter, $P(x,y,\theta)$ is the measured or predicted power at location x, y, propagating in the direction $\theta$ with respect to the x-axis, $\delta$ is the Dirac delta function, $$D_x(\theta) = \left[ \frac{2s(\theta)}{\overline{d}_x |\cos\theta|} + \frac{1}{\xi_1 \cos^2\theta} \right]^{-1},$$

$$D_y(\theta) = \left[ \frac{2s(\pi/2 - \theta)}{\overline{d}_y |\sin\theta|} + \frac{1}{\xi_1 \sin^2\theta} \right]^{-1},$$

and $\xi_1$ is a fit parameter, with the boundary condition $$\hat{n} \cdot \vec{\nabla} P(x, y, \theta) = -\frac{K_{ext}}{\left| \hat{n} \cdot \vec{l}_{wall}(\theta) \right|} P(x, y, \theta), \text{ wherein}$$

$$K_{ext} = \frac{2(1 - B(\theta))}{1 + B(\theta)(1 - 2s(\theta))}, \vec{l}_{wall}(\theta) = \begin{bmatrix} \frac{\overline{d}_x}{s(\theta)|\cos\theta|} \\ \frac{\overline{d}_y}{s(\pi/2 - \theta)|\sin\theta|} \end{bmatrix}$$

and $\hat{n}$ is the unit vector normal to the boundary at the boundary point x, y.

14. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY a transmitter at a first location $x_0$, $y_0$ for radiating a trial signal with a transmit power, $P_0$; and a signal strength detector for measuring a received power $P_1$ of said trial signal at a second location $x_1$, $y_1$;

the number and location of said wireless base station or stations is based on a wireless propagation model that involves estimation of a mean wall separation, $\overline{d}_x$, in a first direction for said given floor and estimation of a mean wall separation, $\overline{d}_y$, in a second direction for said given floor, estimation of a interior reflection coefficient, $s(\theta)$, estimation of an exterior reflection coefficient, $B(\theta)$, for said given floor, said transmit power, $P_0$, said first location $x_0$, $y_0$, said received power $P_1$, said second location $x_1$, $y_1$, and on the solution to the partial differential equation $$D_x(\theta) \frac{\partial^2 P(x, y, \theta)}{\partial x^2} + D_y(\theta) \frac{\partial^2 P(x, y, \theta)}{\partial y^2} - \frac{P(x, y, \theta)}{\xi_1} + P_0 \delta(x - x_0) \delta(y - y_0) = 0$$

wherein $x_0$, $y_0$ is the location of the transmitter, $P(x,y,\theta)$ is the measured or predicted power at location x, y, propagating in the direction $\theta$ with respect to the x-axis, $\delta$ is the Dirac delta function, $$D_x(\theta) = \frac{\overline{d}_x |\cos\theta|}{2s(\theta)}, D_y(\theta) = \frac{\overline{d}_y |\sin\theta|}{2s(\pi/2 - \theta)},$$

and $\xi_1$ is a fit parameter, with the boundary condition $$\hat{n} \cdot \vec{\nabla} P(x, y, \theta) = -\frac{K_{ext}}{\left| \hat{n} \cdot \vec{l}_{wall}(\theta) \right|} P(x, y, \theta), \text{ wherein}$$

$$K_{ext} = \frac{2(1 - B(\theta))}{1 + B(\theta)(1 - 2s(\theta))}, \vec{l}_{wall}(\theta) = \begin{bmatrix} \frac{\overline{d}_x}{s(\theta)|\cos\theta|} \\ \frac{\overline{d}_y}{s(\pi/2 - \theta)|\sin\theta|} \end{bmatrix}$$

and $\hat{n}$ is the unit vector normal to the boundary at the boundary point x, y.

15. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY a transmitter at a fist location $x_0$, $y_0$ for radiating a trial signal with a transmit power, $P_0$; and a signal strength detector for measuring a received power $P_1$ of said trial signal at a second location $x_1$, $y_1$;

the number and location of said wireless base station or stations is based on a wireless propagation model that involves estimation of a mean wall separation, $\overline{d}_x$, in a first direction for said given floor and estimation of a mean wall separation, $\overline{d}_y$, in a second direction for said given floor, estimation of a interior reflection coefficient, $s(\theta)$, estimation of an exterior reflection coefficient, $B(\theta)$, for said given floor, said transmit power, $P_0$, said first location $x_0$, $y_0$, said received power $P_1$, said second location $x_1$, $y_1$, and on the solution to the partial differential equation:

$$D_x(\theta)\frac{\partial^2 P(x,y,\theta)}{\partial x^2} + D_y(\theta)\frac{\partial^2 P(x,y,\theta)}{\partial y^2} - \frac{P(x,y,\theta)}{\xi_1} - \frac{P(x,y,\theta) - \langle P(x,y,\theta)\rangle}{\xi_2} + P_0\delta(x-x_0)\delta(y-y_0) = 0$$

wherein $x_0$, $y_0$ is the location of the transmitter, $P(x,y,\theta)$ is the measured or predicted power at location x, y, propagating in the direction $\theta$, $\delta$ is the Dirac delta function, $$D_x(\theta) = \left[\frac{2s(\theta)}{\overline{d}_x|\cos\theta|} + \frac{1}{\xi_1\cos^2\theta} + \frac{1}{\xi_2\cos^2\theta}\right]^{-1},$$

$$D_y(\theta) = \left[\frac{2s(\pi/2-\theta)}{\overline{d}_y|\sin\theta|} + \frac{1}{\xi_1\sin^2\theta} + \frac{1}{\xi_2\sin^2\theta}\right]^{-1},$$

$$\langle P(x,y,\theta)\rangle = \frac{1}{2\pi}\int_0^{2\pi} P(x,y,\theta)d\theta$$

and $\xi_1$ and $\xi_2$ are fit parameters, with the boundary condition $$\hat{n}\cdot\vec{\nabla}P(x,y,\theta) = -\frac{K_{ext}}{\left|\hat{n}\cdot\vec{l}_{wall}(\theta)\right|}P(x,y,\theta), \text{ wherein}$$

$$K_{ext} = \frac{2(1-B(\theta))}{1+B(\theta)(1-2s(\theta))} \text{ and}$$

$$\vec{l}_{wall}(\theta) = \begin{bmatrix} \dfrac{\overline{d}_x}{s(\theta)|\cos\theta|} \\ \dfrac{\overline{d}_y}{s(\pi/2-\theta)|\sin\theta|} \end{bmatrix}.$$

16. A building comprising one or more floors, with a wireless base station or stations being disposed on a given floor, with the number and location of said wireless base stations selected such that the signal from said wireless base station or stations has a power level essentially everywhere on said given floor above a threshold;

CHARACTERIZED BY a transmitter at a first location $x_0$, $y_0$ for radiating a trial signal with a transmit power, $P_0$; and a signal strength detector for measuring a received power $P_1$ of said trial signal at a second location $x_1$, $y_1$;

the number and location of said wireless base station or stations is based on a wireless propagation model that involves estimation of a mean wall separation, $\overline{d}_x$, in a first direction for said given floor and estimation of a mean wall separation, $\overline{d}_y$, in a second direction for said given floor, estimation of a interior reflection coefficient, $s(\theta)$, estimation of an exterior reflection coefficient, $B(\theta)$, for said given floor, said transmit power, $P_0$, said first location $x_0$, $y_0$, said received power $P_1$, said second location $x_1$, $y_1$, and on the solution to the partial differential equation:

$$D_x(\theta)\frac{\partial^2 P(x,y,\theta)}{\partial x^2} + D_y(\theta)\frac{\partial^2 P(x,y,\theta)}{\partial y^2} - \frac{P(x,y,\theta)}{\xi_1} - \frac{P(x,y,\theta) - \langle P(x,y,\theta)\rangle}{\xi_2} + P_0\delta(x-x_0)\delta(y-y_0) = 0$$

wherein $x_0$, $y_0$ is the location of the transmitter, $P(x,y,\theta)$ is the measured or predicted power at location, x, y, propagating in the direction $\theta$, $\delta$ is the Dirac delta function, $$D_x(\theta) = \frac{\overline{d}_x|\cos\theta|}{2s(\theta)}, D_y(\theta) = \frac{\overline{d}_y|\sin\theta|}{2s(\pi/2-\theta)},$$

$$\langle P(x,y,\theta)\rangle = \frac{1}{2\pi}\int_0^{2\pi} P(x,y,\theta)d\theta$$

and $\xi_1$ and $\xi_2$ are fit parameters, with the boundary condition $$\hat{n}\cdot\vec{\nabla}P(x,y,\theta) = -\frac{K_{ext}}{\left|\hat{n}\cdot\vec{l}_{wall}(\theta)\right|}P(x,y,\theta), \text{ wherein}$$

$$K_{ext} = \frac{2(1-B(\theta))}{1+B(\theta)(1-2s(\theta))} \text{ and}$$

$$\vec{l}_{wall}(\theta) = \begin{bmatrix} \dfrac{\overline{d}_x}{s(\theta)|\cos\theta|} \\ \dfrac{\overline{d}_y}{s(\pi/2-\theta)|\sin\theta|} \end{bmatrix}.$$

\* \* \* \* \*